(12) United States Patent
Tsypkaykin et al.

(10) Patent No.: US 11,680,490 B2
(45) Date of Patent: Jun. 20, 2023

(54) BLADE FOR A TURBO MACHINE, BLADE ASSEMBLY, GAS TURBINE, AND METHOD FOR MANUFACTURING A BLADE FOR A TURBO MACHINE

(71) Applicant: DOOSAN ENERBILITY CO., LTD., Changwon (KR)

(72) Inventors: Igor Tsypkaykin, Baden (CH); Stefan Emanuel Martin, Baden (CH); Wade Beaumont, Baden (CH); Joerg Krueckels, Baden (CH); Willy H Hoffmann, Baden (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/848,451

(22) Filed: Jun. 24, 2022

(65) Prior Publication Data

US 2023/0003134 A1 Jan. 5, 2023

(30) Foreign Application Priority Data

Jul. 1, 2021 (EP) ..................................... 21183190

(51) Int. Cl.
*F01D 5/30* (2006.01)
*F01D 5/14* (2006.01)

(52) U.S. Cl.
CPC ........... *F01D 5/3007* (2013.01); *F01D 5/141* (2013.01); *F01D 5/147* (2013.01)

(58) Field of Classification Search
CPC ........ F01D 5/3007; F01D 5/141; F01D 5/147; F01D 5/30; F01D 5/3015; F01D 5/32; F01D 5/323; F01D 5/326
See application file for complete search history.

(56) References Cited

U.S. PATENT DOCUMENTS

2015/0240649 A1* 8/2015 Botrel ..................... F01D 5/085
416/97 R

* cited by examiner

*Primary Examiner* — Jacob M Amick
(74) *Attorney, Agent, or Firm* — Harvest IP Law LLP

(57) ABSTRACT

A blade for turbo machine is provided. The blade for a turbo machine includes an airfoil body extending in a radial direction between a root end and a tip end and including an inner void extending from the root end in the radial direction, a root body integrally formed with the airfoil body, extending from the root end of the air foil body to a bottom end in the radial direction, and including a receiving slot extending from the bottom end in the radial direction and opening into the inner void of the air foil body, and an insert positioned in the receiving slot of the root body and including a plurality of through holes extending in the radial direction to form a fluid connection to the inner void of the air foil body.

20 Claims, 13 Drawing Sheets

BLADE FOR A TURBO MACHINE, BLADE ASSEMBLY, GAS TURBINE, AND METHOD FOR MANUFACTURING A BLADE FOR A TURBO MACHINE

CROSS REFERENCE TO RELATED APPLICATION

This application claims priority to European Patent Application No. 21183190.4, filed on Jul. 1, 2021, the disclosure of which is incorporated herein by reference in its entirety.

BACKGROUND

1. Field

Apparatuses and methods consistent with exemplary embodiments relate to a blade for a turbo machine such as a gas turbine, a blade assembly, a gas turbine, and a method for manufacturing a blade for a turbo machine.

2. Description of the Related Art

Blades of turbo machines such as gas turbines comprise an airfoil section or body exposed to a working fluid and a root body forming a mechanical interface for coupling the blade to a rotor disk. Because the blades of turbo machines have to be able to withstand high temperatures, the blades include inner voids or cavities for circulating cooling fluid therein. In a related art, the blades are manufactured in a casting process in which a core is provided to form the inner cavity and over molded with liquid metal. Typically, the inner void is opened in the root body after the casting process to remove the core and to receive the cooling fluid.

For example, GB 2411442 A discloses a turbine blade having a firtree shaped root body, wherein multiple radial cooling channels are formed in the root body. A similar turbine blade is disclosed in EP 3059394 A1.

The root body, as the mechanical interface to the disk, carries high mechanical loads. Therefore, to achieve a uniform load distribution within the root body, number and cross-sectional area of openings of the inner void in the root body have to be designed carefully.

SUMMARY

According to an aspect of an exemplary embodiment, there is provided a blade for a turbo machine including: an airfoil body extending in a radial direction between a root end and a tip end and including an inner void extending from the root end in the radial direction; a root body integrally formed with the airfoil body, extending from the root end of the air foil body to a bottom end in the radial direction, and including a receiving slot extending from the bottom end in the radial direction and opening into the inner void of the air foil body; and an insert positioned in the receiving slot of the root body and including a plurality of through holes extending in the radial direction to form a fluid connection to the inner void of the air foil body.

The root body may extend between a front end and an aft end along an axial direction running across the radial direction. The receiving slot may extend fully between the front end and the aft end of the root body, and the insert positioned in the receiving slot may extend between the front end and the aft end of the root body.

The insert may include a first end plate formed at a first axial end of the insert and a second end plate formed at a second axial end of the insert, the first end plate abuts a first end surface forming the front end of the root body, and the second end plate abuts a second end surface forming the aft end of the root body.

The through holes may be formed in a central region of the insert that overlaps with the inner void of the airfoil body with respect to the axial direction.

The root body may extend between a front end and an aft end along an axial direction running across the radial direction, and the receiving slot may extend in the axial direction and ends apart from the front end and the aft end.

The insert may be brazed to the root body or friction fit into the receiving slot.

The plurality of through holes of the insert may have a circular, an elliptic, or racetrack shaped cross-section, the plurality of through holes of the insert may be arranged in a row along an insert axial direction, and a ratio between a distance between adjacent through holes in the insert axial direction and a diameter of the through holes with respect to the insert axial direction may be greater than 1.

The insert may have a thickness with respect to an insert thickness direction, and a ratio between a diameter and the thickness of the through holes with respect to the insert thickness direction may be in a range of 0.1 to 0.8.

The insert may further include grooves formed in a circumferential surface of the insert and extending in the radial direction between opposite radial ends of the insert, and the grooves together with an inner surface of the receiving slot form fluid channels connected to the inner void of the airfoil body.

According to an aspect of another exemplary embodiment, there is provided a blade assembly including: a plurality of blades; and a rotor disk to which the plurality of blades are coupled, wherein each of the plurality of blades may include: an airfoil body extending in a radial direction between a root end and a tip end and including an inner void extending from the root end in the radial direction; a root body integrally formed with the airfoil body, extending from the root end of the air foil body to a bottom end in the radial direction, and including a receiving slot extending from the bottom end in the radial direction and opening into the inner void of the air foil body; and an insert positioned in the receiving slot of the root body and including a plurality of through holes extending in the radial direction to form a fluid connection to the inner void of the air foil body.

According to an aspect of another exemplary embodiment, there is provided a gas turbine including: a blade assembly including a plurality of blades and a rotor disk to which the plurality of blades are coupled, wherein each of the plurality of blades may include: an airfoil body extending in a radial direction between a root end and a tip end and including an inner void extending from the root end in the radial direction; a root body integrally formed with the airfoil body, extending from the root end of the air foil body to a bottom end in the radial direction, and including a receiving slot extending from the bottom end in the radial direction and opening into the inner void of the air foil body; and an insert positioned in the receiving slot of the root body and including a plurality of through holes extending in the radial direction to form a fluid connection to the inner void of the air foil body.

According to one or more exemplary embodiments, the blade assembly forms part of a turbine stage of the gas turbine.

According to one or more exemplary embodiments, a method of manufacturing a blade may include manufacturing the insert, e.g., by machining a block shaped body from a massif block and drilling the through holes into the block shaped body. Alternatively, the insert may be built in an additive manufacturing method, e.g., a 3D-printing process such as selective laser melting or the like.

BRIEF DESCRIPTION OF THE DRAWINGS

The above and other aspects will become more apparent from the following description of the exemplary embodiments with reference to the accompanying drawings, in which.

DETAILED DESCRIPTION OF THE DISCLOSURE

Figure 1:
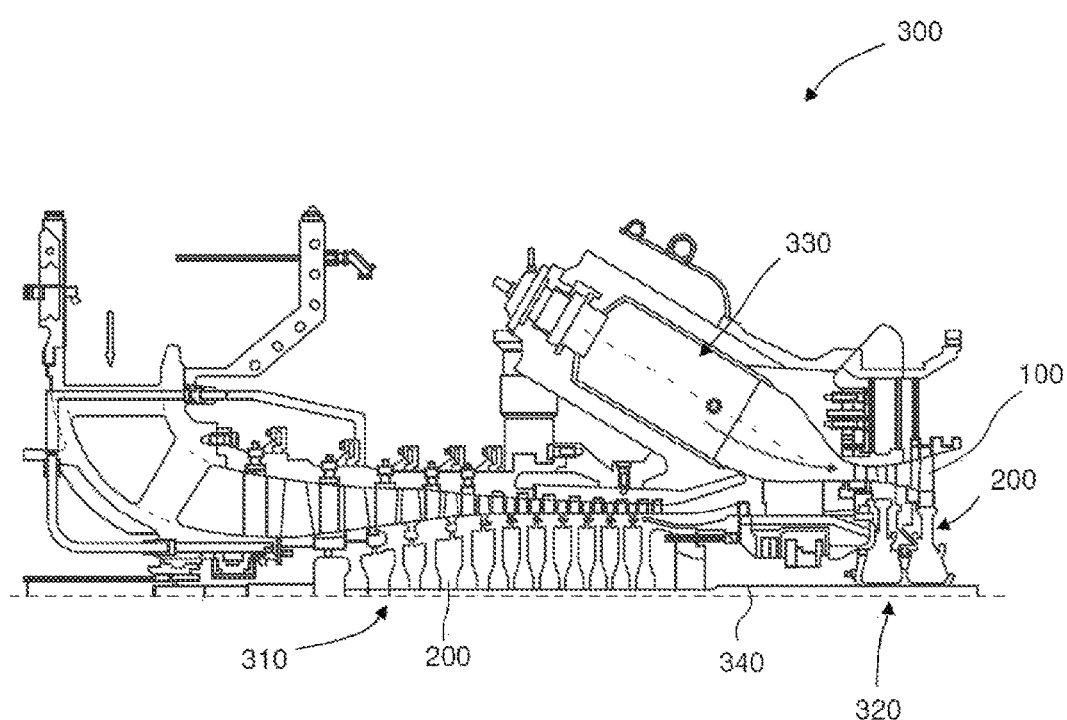
FIG. 1 is a schematic cross-sectional view of a gas turbine according to an exemplary embodiment.

Various changes and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the sprit and technical scope disclosed herein.

The terminology used herein is for the purpose of describing specific embodiments only, and is not intended to limit the scope of the disclosure. The singular expressions "a", "an", and "the" may include the plural expressions as well, unless the context clearly indicates otherwise. In the disclosure, the terms such as "comprise", "include", "have/has" should be construed as designating that there are such features, integers, steps, operations, components, parts, and/ or combinations thereof, not to exclude the presence or possibility of adding one or more other features, integers, steps, operations, components, parts and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, exemplary embodiments will be described with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, some components in the accompanying drawings are exaggerated, omitted, or schematically illustrated.

FIG. 1 is a schematic cross-sectional view of a gas turbine 300. Referring to FIG. 1, the gas turbine 300 includes a compressor section 310 configured to rotate about a rotational axis to compress a working fluid, a turbine section 320 configured to be rotated about the rotational axis by expanding the working fluid, and a combustion chamber 330 configured to combust fuel with the working fluid. The turbine section 320 is kinematically coupled to the compressor section 310 to rotate the compressor section 310. The compressor section 310 and the turbine section 320 each include a plurality of blade assemblies 200 that may be mounted to a common central shaft 340. Each blade assembly 200 includes a plurality of blades 100 extending in a radial direction and comprising an aerodynamic surface. The working principle of the gas turbine 300 is well known to a person skilled in the art and, therefore, a detailed description thereof will be omitted herein.

Figure 2:
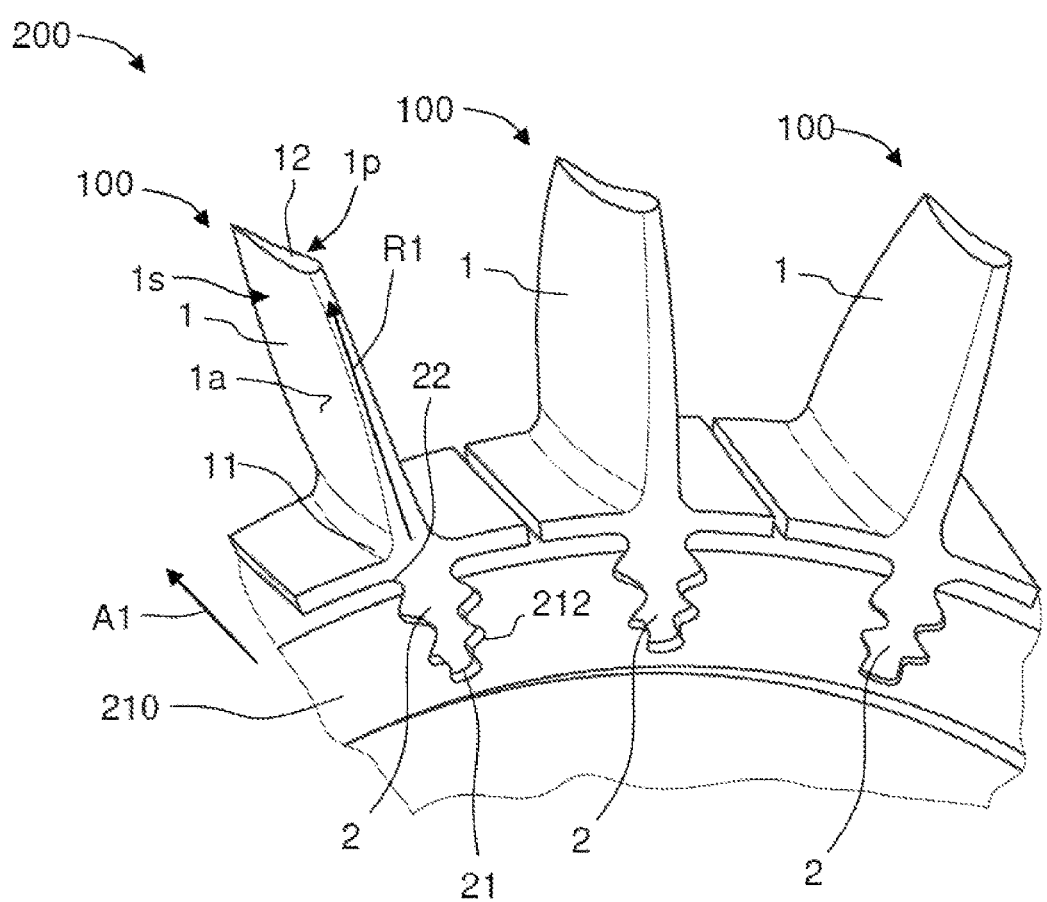
FIG. 2 is a schematic partial view of a blade assembly according to an exemplary embodiment.

FIG. 2 is a schematic partial view of a blade assembly 200 for the gas turbine 300. Referring to FIG. 2, the blade assembly 200 includes a plurality of blades 100 and a rotor disk 210 to which the plurality of turbine blades 100 are coupled. The rotor disk 210 functions as a carrier for the blades 100 and may be fixed to the central shaft 340 of the gas turbine 300.

The blade 100 includes an airfoil body 1, a root body 2, and an insert or plug 3. The blade 1 extends in a radial direction R1. The airfoil body 1 includes an aerodynamic surface 1a exposed to the working fluid. The aerodynamic or flow surface 1a may define a pressure side 1p and a suction side is of the airfoil body 1. The root body 2 is coupled to an inner radial end or root end 11 of the airfoil body 1 and is integrally formed as one single piece with the airfoil body 1. The root body 2 forms a mechanical interface by which the blade 100 is coupled to the rotor disk 210. For example, the root body 2 may comprise a firtree shaped cross section and is inserted into a coupling groove 212 of the rotor disk 210 having a corresponding firtree shaped cross section.

Figure 3:
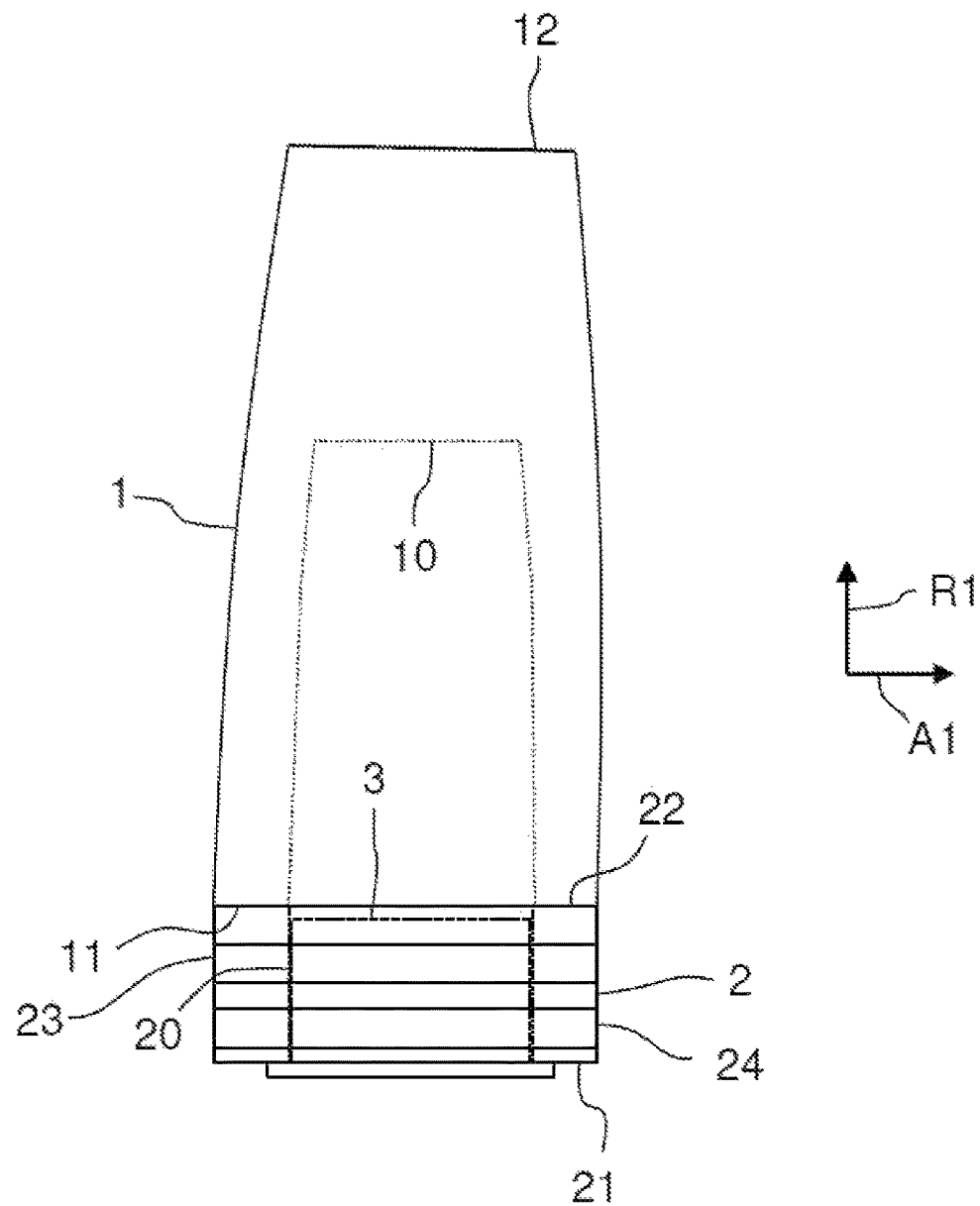
FIG. 3 is a schematic side view of a blade for a turbo machine according to an exemplary embodiment.

FIG. 3 is a schematic side view of the blade 100 according to an exemplary embodiment. Referring to FIG. 3, the airfoil body 1 extends in the radial direction R1 between the radial inner end or root end 11 and a radial outer end or tip end 12, and includes an inner cavity or void 10 extending from the root end 11 in the radial direction R1. The inner cavity or void 10 may extend from the root end 11 to the tip end 12 to form an opening in the tip end 12. Accordingly, the airfoil body 1 is a hollow body.

Figure 4:
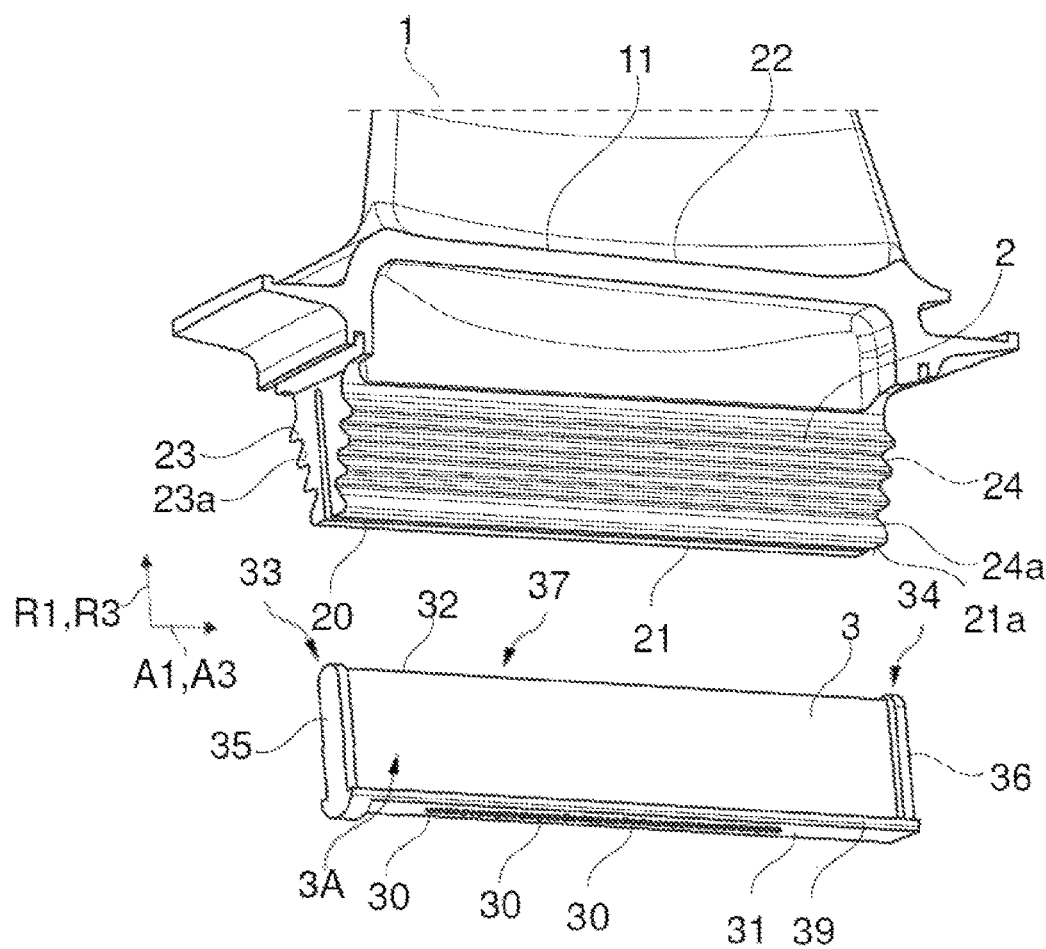
FIG. 4 is an exploded partial view of a blade for a turbo machine according to an exemplary embodiment.

The root body 2 extends between a bottom end 21 and a top end 22 in the radial direction R1. The root body 2 is integrally formed with the airfoil body 1, and the top end 22 of the root body 2 abuts or corresponds to the root end 11 of the airfoil body 1. Thus, the root body 2 extends from the root end 11 of the air foil body 1 to the bottom end 21 in the radial direction R1. The root body 2 extends in an axial direction A1 extending transversely to the radial direction R1 between a leading or front end 23 and a trailing or aft end 24 opposite to the front end 23. FIG. 4 is an exploded partial view of the blade 100. Referring to FIGS. 3 and 4, the front end 23 of the root body 2 may be formed by a first end surface 23a which may be plane or even, and the aft end 24 of the root body 2 may be formed by a second end surface 24a which may be plane or even.

Figure 5:
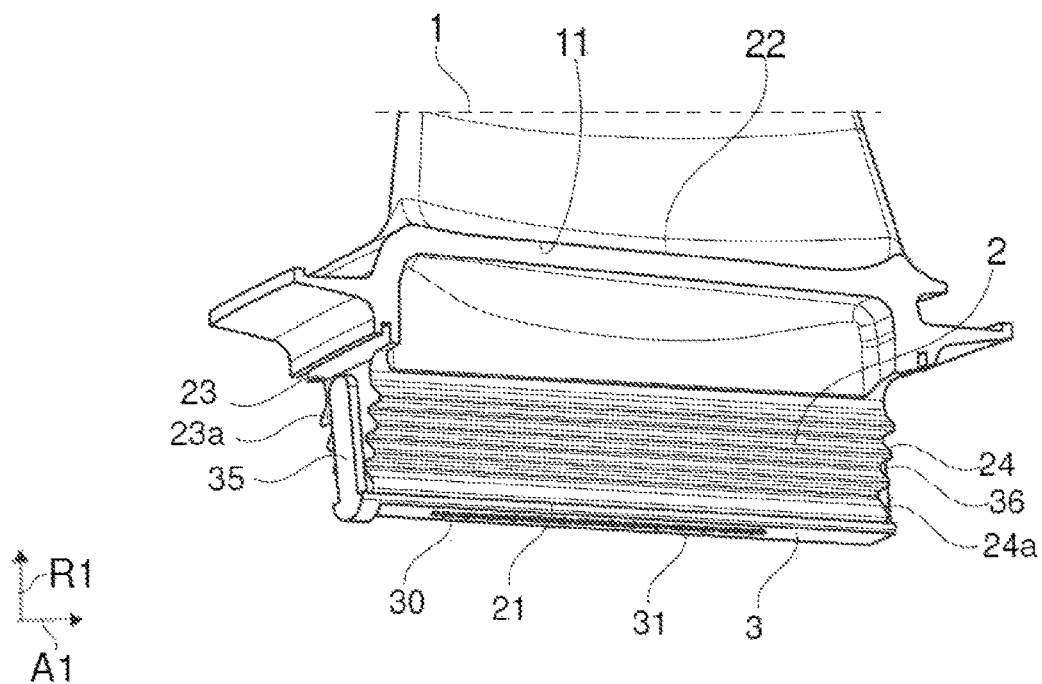
FIG. 5 is a partial view of the blade shown in FIG. 4 in an assembled state.
Figure 11:
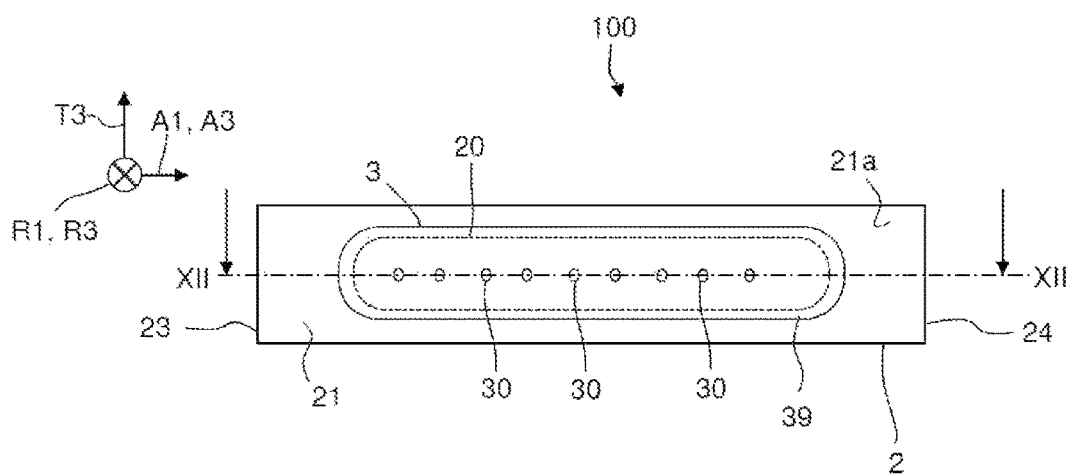
FIG. 11 is a top view to a bottom end of a root body of a blade for a turbo machine according to another exemplary embodiment.
Figure 12:
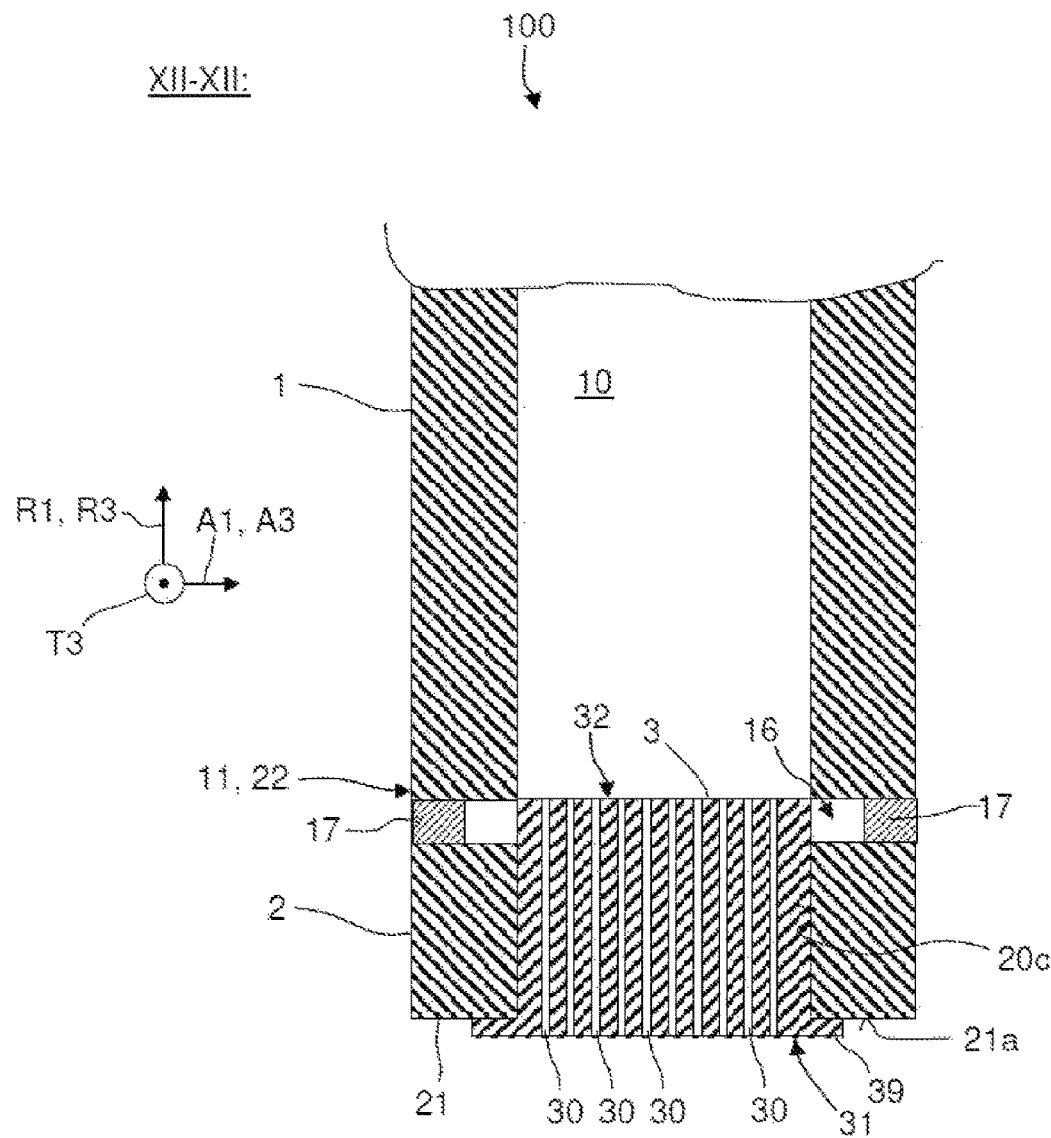
FIG. 12 is a cross sectional view of the blade taken along line XII-XII of FIG. 11.

The root body 2 includes a receiving slot 20 extending from the bottom end 21 in the radial direction R1 and opening into the inner void 10 of the air foil body 1. Thus, the receiving slot 20 forms a through hole extending through the root body 2 from the bottom end 21 to the top end 22 of the root body 2 in the radial direction R1. Further, the receiving slot 20 comprises a predefined length with regard to the axial direction A1 or extends in the axial direction A1. As shown in FIGS. 3, 11, and 12, the receiving slot 20 maybe an end spaced apart from the front end 23 and the aft end 24. Alternatively, as shown in FIGS. 4 and 5, the receiving slot 20 may also extend completely between the front end 23 and the aft end 24 of the root body 2. Accordingly, the receiving slot 20 is a longitudinal opening extending in the axial direction A1.

Referring to FIG. 3, an insert 3 is positioned or inserted in the receiving slot 20 of the root body 2. For example, the insert 3 may be brazed to the root body 2, i.e., to an inner surface of the receiving slot 20. Alternatively, the insert 3 may be friction fit into the receiving slot 20, that is, at least a width of the receiving slot 20 and a thickness t3 of the insert 3 may be dimensioned such that the thickness t3 is oversized relative to the width of the receiving slot 20.

Figure 6:
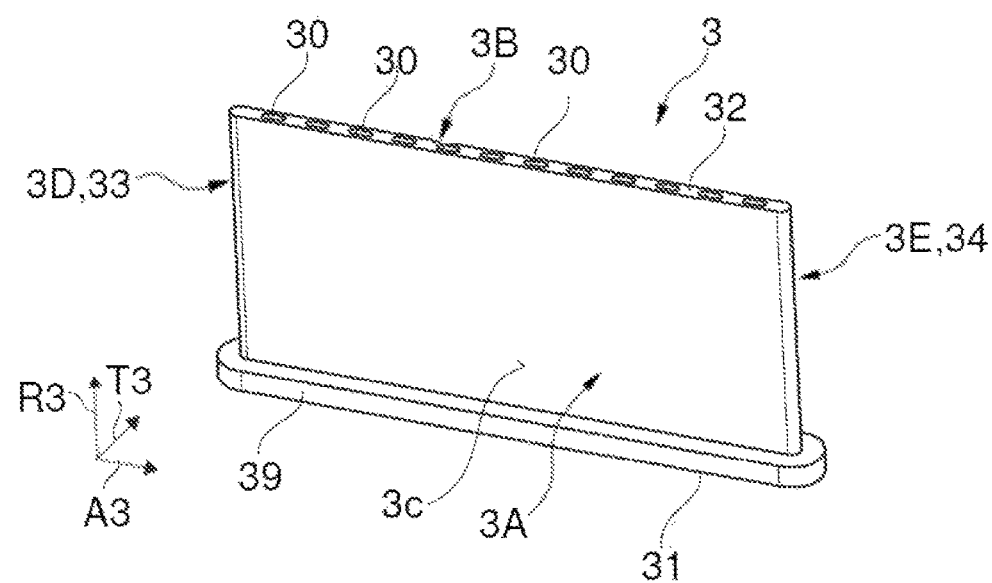
FIG. 6 is a perspective view of an insert of a blade for a turbo machine according to an exemplary embodiment.
Figure 7:
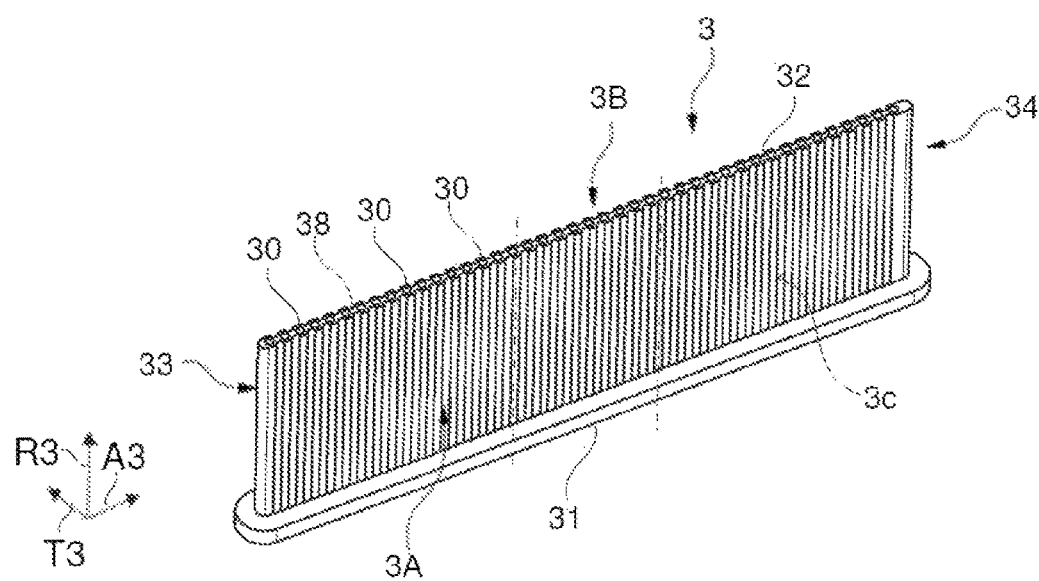
FIG. 7 is a perspective view of an insert of a blade for a turbo machine according to another exemplary embodiment.
Figure 8:
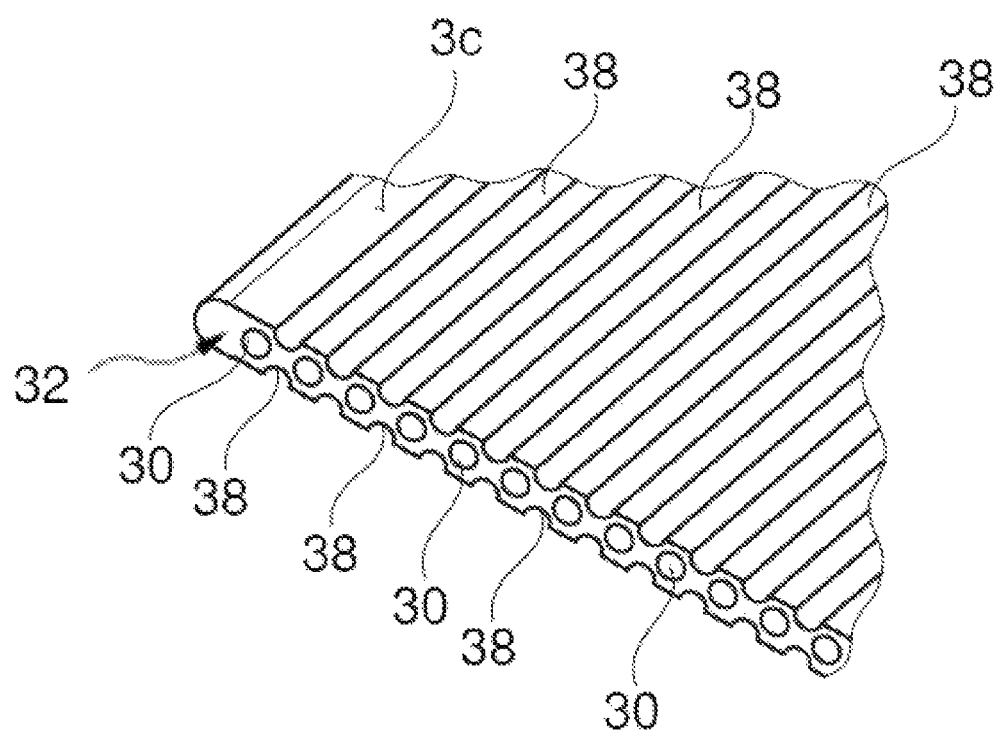
FIG. 8 is a detailed partial view of a circumferential surface of the insert shown in FIG. 7.
Figure 9:
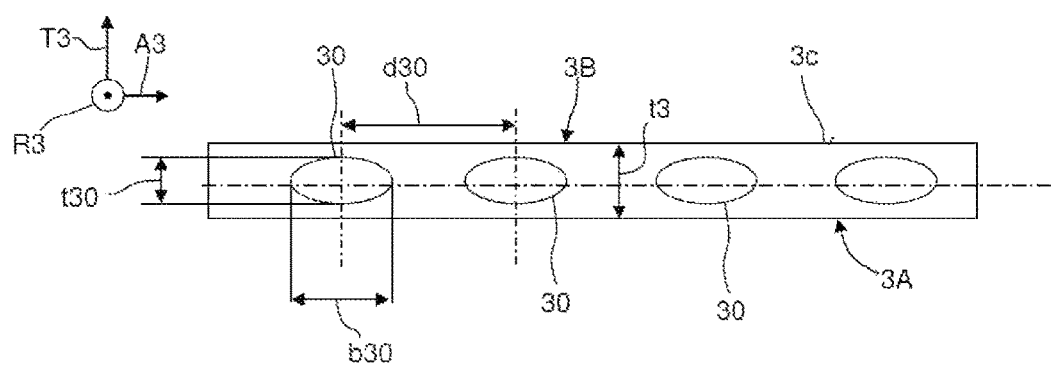
FIG. 9 is a top view to an insert of a blade for a turbo machine according to an exemplary embodiment.
Figure 10:
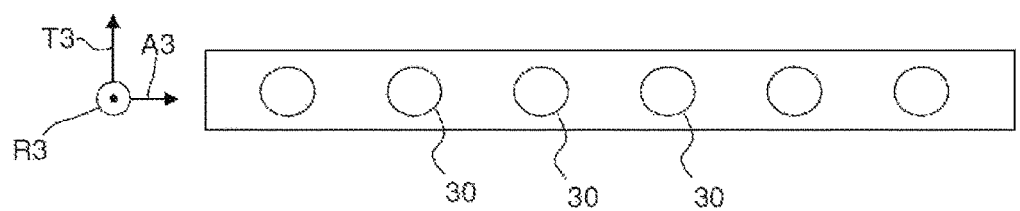
FIG. 10 is a top view to an insert of a blade for a turbo machine according to another exemplary embodiment.

FIG. 6 is a perspective view of an insert of a blade for a turbo machine according to an exemplary embodiment. FIG. 7 is a perspective view of an insert of a blade for a turbo machine according to another exemplary embodiment. FIG. 8 is a detailed partial view of a circumferential surface of the insert shown in FIG. 7. FIG. 9 is a top view to an insert of a blade for a turbo machine according to an exemplary embodiment. FIG. 10 is a top view to an insert of a blade for a turbo machine according to another exemplary embodiment. FIG. 11 is a top view to a bottom end of a root body of a blade for a turbo machine according to another exemplary embodiment. FIG. 12 is a cross sectional view of the blade taken along line XII-XII of FIG. 11.

Referring to FIG. 6, the insert 3 may have a shape of a block. The insert 3 extends between a first axial end 33 and an opposite second axial end 34 with respect to an insert axial direction A3. Similarly, the insert 3 extends between a first radial end 31 and a second radial end 32 with respect to an insert radial direction R3 extending transverse to the insert axial direction A3. The insert 3 includes a circumferential surface 3c which may define a first side face 3A and a second side face 3B opposite to the first side face 3A with regard to a thickness direction T3 extending transverse to the insert axial direction A3 and the insert radial direction R3. A thickness t3 of the insert 3 is defined between the opposing first and second side faces 3A, 3B. The circumferential surface 3c may also define circular or planar end faces 3D, 3E forming the first and second axial ends 33, 34 of the insert 3. The insert 3 may comprise a radial end rim 39 arranged at the first radial end 31 and protruding from the circumferential surface 3c with respect to the thickness direction T3. The rim 39 may extend over the entire circumference of the insert 3. Additionally or alternatively to the rim 39, the insert 3 may comprise a first end plate 35 formed at the first axial end 33 of the insert 3 and a second end plate 36 formed at the second axial end 34 of the insert 3, as shown in FIGS. 4 and 5. For example, the end plates 35, 36 protrude from the insert 3 in the thickness direction T3 over the first and second side faces 3A, 3B of the insert 3.

Referring to FIG. 6, the insert 3 includes a plurality of through holes 30 extending in the radial direction R1 between the first radial end 31 and the second radial end 32. As shown in FIG. 12, in a state when the insert 3 is positioned in the receiving slot 20 of the root body 2 such that the insert axial direction A3 is aligned with the axial direction A1 and the insert radial direction R3 is aligned with the radial direction R1, the through holes 30 form a fluid connection to the inner void 10. The through holes 30 may have a racetrack shaped cross-section. Alternatively, the through holes 30 may have an elliptic cross-section as shown in FIG. 9, or a circular cross-section as shown in FIGS. 7, 8, and 10.

For example, the through holes 30 may be sequentially arranged with respect to the insert axial direction A3. Referring to FIG. 9, one through hole 30 may be spaced apart from an adjacent through hole 30 in the insert axial direction A3 by a distance d30. The distance d30 in the insert axial direction A3 may be measured between the central axes of the through holes 30. For example, a ratio between the distance d30 between adjacent through holes 30 and a diameter b30 of the through holes 30 with respect to the insert axial direction A3, that is, the ratio d30:b30, may be greater than 1. Here, a ratio between a diameter t30 of the through holes 30 and the thickness t3 of the insert 3 with respect to the insert thickness direction T3 may be in a range between 0.1 and 0.8.

Referring to FIGS. 7 and 8, the insert 3 may include a plurality of grooves 38 formed in the circumferential surface 3c of the insert 3. The grooves 38 may be formed in the first and second side faces 3A, 3B of the insert 3, and extend in the insert radial direction R1. For example, the grooves 38 may extend parallel to each other and may be spaced apart from each other in the insert axial direction A3. The grooves 38 may have a semi-circular cross-section. For example, one groove 38 may be arranged between two adjacent through holes 30 with respect to the insertion axis direction A3. Although FIGS. 7 and 8 show that grooves 38 are formed on both the first and second side faces 3A, 3B of the insert 3, it is understood that the grooves 38 may be provided only on one of the first and second side faces 3A, 3B of the insert 3.

The insert 3 may be made of a metal material that can withstand high temperatures. For example, the insert 3 may be made of a nickel based alloy such as IN625, IN718, Hast X, Haynes 230, or the like. Alternatively, cobalt alloy such as L-605 or alloy steels such as SS310 is possible materials.

As described above, in an assembled state of the blade 100, the insert 3 is inserted or positioned in the receiving slot 20 of the root body 2. In this state, the insert axial direction A3 is aligned with the axial direction A1, and the insert radial direction R3 is aligned with the radial direction R1, as shown in FIGS. 3, 5, 11, and 12. The through holes 30 form a fluid connection to the inner void 10 of the airfoil body 1.

If provided, the rim 39 abuts or contacts an end surface 21a forming the bottom end 21 of the root body 2. Similarly, the first end plate 35 abuts the first end surface 23a forming the leading end 23 of the root body 2, and the second end plate 36 abuts the second end surface 24b forming the trailing end 24 of the root body 2. Further, the grooves 38 of the insert 3 together with an inner surface 20c of the receiving slot 20 form fluid channels connected to the inner void 10 of the airfoil body 1.

Here, the dimensions and shapes of the insert 3 and the receiving slot 20 correspond to each other such that the insert 3 can be received within the receiving slot 20. For example, when the receiving slot 20 extends between the leading end 23 and the trailing end 24 of the root body 2, the insert 3 may also extend between the leading end 23 and the trailing end 24 of the root body 2, as shown in FIG. 5. Similarly, when the receiving slot 20 ends at a distance from the leading and trailing ends 23, 24 of the root body 2, the length of the insert 3 may correspond to the length of the receiving slot 20. Further, when the inner void 10 at the root end 11 of the airfoil body 1 has a length smaller than the length of the slot 20 in the axial direction A1, the through holes 30 may be arranged in the insert 3 such that the through holes 30 are formed only in a central region 37 of the insert 3 that overlaps with the inner void 10 of the airfoil body 1 with respect to the axial direction A1, as shown in FIGS. 4 and 5.

Figure 13:
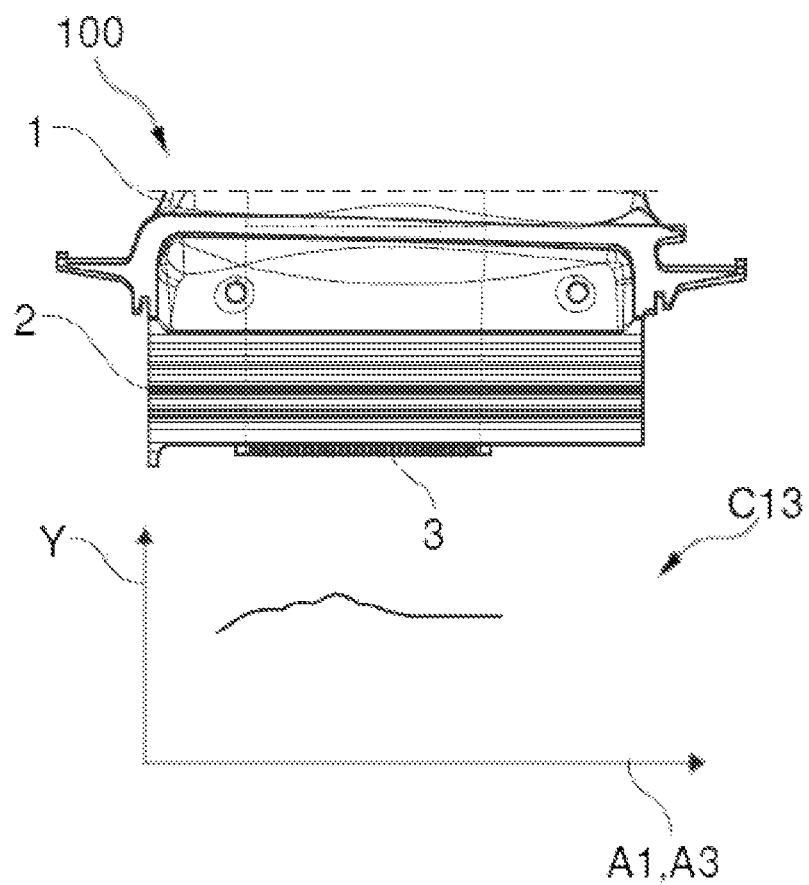
FIG. 13 is a side view of a blade for a turbo machine according to an exemplary embodiment together with a diagram shown a distribution of mechanical stress in the root body along an axial direction.

FIG. 13 is a side view of a blade 100 together with a diagram shown a distribution of mechanical stress in the root body along the axial direction. Referring to FIG. 13, the root body 2 and a root end region of the airfoil body 1 are shown with the insert 3 inserted into the receiving slot 20 together with a diagram C13. In the diagram C13, an abscissa or x-coordinate is aligned with the axial direction A1, and an ordinate or Y-axis Y represents mechanical stress within the root body 2. As can be seen in diagram C13, a very uniform stress distribution along the axial direction A1 can be achieved due to the combination of the receiving slot 20 filled by the insert 3.

Figure 14:
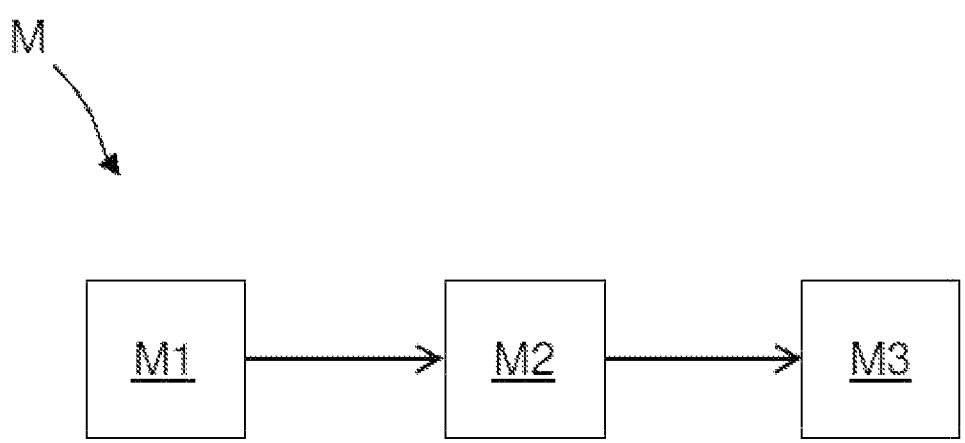
FIG. 14 is a schematic flow diagram of a method for manufacturing a blade according to an exemplary embodiment.

FIG. 14 is a schematic flow diagram of a method M for manufacturing the blade 100 according to an exemplary embodiment. In a first step M1, the airfoil body 1 and the root body 2 are integrally casted. For example, a core defining the shape of the inner void 10 of the airfoil body 1 may be used. The core may define a continuous channel from the airfoil body 1 through the root body 2 along the radial direction. Alternatively, the core may define the inner void 10 and a channel 16 connected to the inner void 10 and extending in the axial direction through the root body 2, as shown in FIG. 12.

In a step M2, the receiving slot 20 is machined into the root body 2. This step may include grinding, drilling, cutting, or similar removal machining processes. For example, the entire receiving slot 20 may be machined from the massive material of the root body 2. Alternatively, machining the receiving slot 20 may include widening or enlarging the radial channel defined by the core.

In a step M3, the insert 3 is inserted into the receiving slot 20 of the root body 2. Optionally, the step M3 may also include fixing the insert 3 in the receiving slot 20, e.g., by brazing. Moreover, when the core defines an axial channel 16 as shown in FIG. 12, the channel 16 may be closed by a plug 17, e.g., by brazing.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A blade for a turbo machine comprising:
    an airfoil body extending in a radial direction between a root end and a tip end and including an inner void extending from the root end in the radial direction;
    a root body integrally formed with the airfoil body, extending from the root end of the air foil body to a bottom end in the radial direction, and including a receiving slot extending from the bottom end in the radial direction and opening into the inner void of the air foil body; and
    an insert positioned in the receiving slot of the root body and including a plurality of through holes extending in the radial direction to form a fluid connection to the inner void of the air foil body.

2. The blade according to claim 1, wherein the root body extends between a front end and an aft end along an axial direction running across the radial direction,
    wherein the receiving slot extends fully between the front end and the aft end of the root body, and the insert positioned in the receiving slot extends between the front end and the aft end of the root body.

3. The blade according to claim 2, wherein the insert comprises a first end plate formed at a first axial end of the insert and a second end plate formed at a second axial end of the insert,
    wherein the first end plate abuts a first end surface forming the front end of the root body, and the second end plate abuts a second end surface forming the aft end of the root body.

4. The blade according to claim 2, wherein the through holes are formed in a central region of the insert that overlaps with the inner void of the airfoil body with respect to the axial direction.

5. The blade according to claim 1, wherein the root body extends between a front end and an aft end along an axial direction running across the radial direction,
    wherein the receiving slot extends in the axial direction and ends apart from the front end and the aft end.

6. The blade according to claim 1, wherein the insert is brazed to the root body or friction fit into the receiving slot.

7. The blade according to claim 1, wherein the plurality of through holes of the insert have a circular, an elliptic, or racetrack shaped cross-section,
    wherein the plurality of through holes of the insert are arranged in a row along an insert axial direction, and
    wherein a ratio between a distance between adjacent through holes in the insert axial direction and a diameter of the through holes with respect to the insert axial direction is greater than 1.

8. The blade according to claim 1, wherein the insert has a thickness with respect to an insert thickness direction, and
    wherein a ratio between a diameter and the thickness of the through holes with respect to the insert thickness direction is in a range of 0.1 to 0.8.

9. The blade according to claim 1, wherein the insert further includes grooves formed in a circumferential surface of the insert and extending in the radial direction between opposite radial ends of the insert, and the grooves together with an inner surface of the receiving slot form fluid channels connected to the inner void of the airfoil body.

10. A blade assembly comprising:
a plurality of blades; and
a rotor disk to which the plurality of blades are coupled, wherein each of the plurality of blades comprises:
- an airfoil body extending in a radial direction between a root end and a tip end and including an inner void extending from the root end in the radial direction;
- a root body integrally formed with the airfoil body, extending from the root end of the air foil body to a bottom end in the radial direction, and including a receiving slot extending from the bottom end in the radial direction and opening into the inner void of the air foil body; and
- an insert positioned in the receiving slot of the root body and including a plurality of through holes extending in the radial direction to form a fluid connection to the inner void of the air foil body.

11. The blade assembly according to claim 10, wherein the root body extends between a front end and an aft end along an axial direction running across the radial direction,
wherein the receiving slot extends fully between the front end and the aft end of the root body, and the insert positioned in the receiving slot extends between the front end and the aft end of the root body, and
wherein the insert comprises a first end plate formed at a first axial end of the insert and a second end plate formed at a second axial end of the insert, and the first end plate abuts a first end surface forming the front end of the root body, and the second end plate abuts a second end surface forming the aft end of the root body.

12. The blade assembly according to claim 11, wherein the through holes are formed in a central region of the insert that overlaps with the inner void of the airfoil body with respect to the axial direction, and
wherein the root body extends between a front end and an aft end along an axial direction running across the radial direction, and the receiving slot extends in the axial direction and ends apart from the front end and the aft end.

13. The blade assembly according to claim 10, wherein the insert is brazed to the root body or friction fit into the receiving slot,
wherein the through holes of the insert have a circular, an elliptic, or racetrack shaped cross-section, and the through holes of the insert are arranged in a row along an insert axial direction, and
wherein a ratio between a distance between adjacent through holes in the insert axial direction and a diameter of the through holes with respect to the insert axial direction is greater than 1.

14. The blade assembly according to claim 10, wherein the insert has a thickness with respect to an insert thickness direction, and
wherein a ratio between a diameter and the thickness of the through holes with respect to the insert thickness direction is in a range of 0.1 to 0.8.

15. The blade assembly according to claim 9, wherein the insert further includes grooves formed in a circumferential surface of the insert and extending in the radial direction between opposite radial ends of the insert, and the grooves together with an inner surface of the receiving slot form fluid channels connected to the inner void of the airfoil body.

16. A gas turbine comprising:
a blade assembly comprising a plurality of blades and a rotor disk to which the plurality of blades are coupled, wherein each of the plurality of blades comprises:
- an airfoil body extending in a radial direction between a root end and a tip end and including an inner void extending from the root end in the radial direction;
- a root body integrally formed with the airfoil body, extending from the root end of the air foil body to a bottom end in the radial direction, and including a receiving slot extending from the bottom end in the radial direction and opening into the inner void of the air foil body; and
- an insert positioned in the receiving slot of the root body and including a plurality of through holes extending in the radial direction to form a fluid connection to the inner void of the air foil body.

17. The gas turbine according to claim 16, wherein the root body extends between a front end and an aft end along an axial direction running across the radial direction,
wherein the receiving slot extends fully between the front end and the aft end of the root body, and the insert positioned in the receiving slot extends between the front end and the aft end of the root body, and
wherein the insert comprises a first end plate formed at a first axial end of the insert and a second end plate formed at a second axial end of the insert, and the first end plate abuts a first end surface forming the front end of the root body, and the second end plate abuts a second end surface forming the aft end of the root body.

18. The gas turbine according to claim 17, wherein the through holes are formed in a central region of the insert that overlaps with the inner void of the airfoil body with respect to the axial direction, and
wherein the root body extends between a front end and an aft end along an axial direction running across the radial direction, and the receiving slot extends in the axial direction and ends apart from the front end and the aft end.

19. The gas turbine according to claim 16, wherein the insert is brazed to the root body or friction fit into the receiving slot,
wherein the through holes of the insert have a circular, an elliptic, or racetrack shaped cross-section, and the through holes of the insert are arranged in a row along an insert axial direction, and
wherein a ratio between a distance between adjacent through holes in the insert axial direction and a diameter of the through holes with respect to the insert axial direction is greater than 1.

20. The gas turbine according to claim 16, wherein the insert has a thickness with respect to an insert thickness direction,
wherein a ratio between a diameter and the thickness of the through holes with respect to the insert thickness direction is in a range of 0.1 to 0.8, and
wherein the insert further includes grooves formed in a circumferential surface of the insert and extending in the radial direction between opposite radial ends of the insert, and the grooves together with an inner surface of the receiving slot form fluid channels connected to the inner void of the airfoil body.

* * * * *